Oct. 13, 1970   TSUTOMU IKEDA ET AL   3,533,869
METHOD OF FORMING HOLLOW PLASTIC ARTICLES WITH
WOUND FIBER REINFORCEMENTS
Filed Sept. 1, 1966

INVENTORS
TSUTOMU IKEDA
KIYOSHI FUKUI

BY

McGlew & Toren
ATTORNEYS 3,533,869
METHOD OF FORMING HOLLOW PLAS-
TIC ARTICLES WITH WOUND FIBER
REINFORCEMENTS
Tsutomu Ikeda, Kyoto, and Kiyoshi Fukui, Uji, Japan,
assignors to Taiyo Kogyo Company Limited, Osaka,
Osaka Prefecture, Japan
Filed Sept. 1, 1966, Ser. No. 576,556
Claims priority, application Japan, Sept. 9, 1965,
40/55,264
Int. Cl. B65h 81/00
U.S. Cl. 156—171　　　　　　　　　　　　　　2 Claims

ABSTRACT OF THE DISCLOSURE

In the method of making molded members a film or sheet of a synthetic thermoplastic material is wound about a mandrel forming a continuous covering on its surface, and about the mandrel one or several kinds of fibers are wound to complete the covering. One of the fibers is formed of a material the same as or similar to the material forming the film or sheet which, upon heating to the requisite temperature, effects a fusing of the fiber and the film or sheet covering on the mandrel. In addition, other fibers, which may be either of a thermoplastic substance or natural or metallic fibers are wound on the film or sheet and have a melting temperature sufficiently higher than that of the film or sheet and fibers of a similar substance so that these fibers do not become thermally fused but retain their original form and provide a reinforcement for the molded member produced.

---

This invention relates to new processes for producing cubic (or hollow cubic) air-tight fiber coated molded members or moldings.

An object of the present invention is to provide a molding which is very air-tight and is formed of a film or sheet and fibers which are melted and bonded together.

Another object of the present invention is also to use fibers of a high melting point relative to the melting point of the film or sheet so that they may retain their fiber character and may serve to keep the strength of the molding.

Still another object of the present invention is to provide a product of a beautiful design by coloring the film or sheet and fibers to be used in different colors in advance, or after-dyeing a colorless fiber coated molding so that thick and thin patterns may be produced depending on the dyeability of the heterogeneous fibers and the film.

A further object of the present invention is to provide a process high in the industrial utility for molding such various products as building materials, structures, furniture and commonly used articles.

The formation of the process of the present invention shall be described. A mandrel of any shape is first covered with a meltable film or sheet in advance and then winding one or more kinds of fibers homogeneous, that is, of the same material with said film or sheet and fibers and having a softening point or melting point close to that of said film or sheet and being highly adhesive to said film or sheet or one more kinds of fibers having a softening point or melting point higher than that of the above mentioned fibers. The fibers which do not melt at the time of thermally fusing the first mentioned fibers and the film or sheet are wound by means of a zigzag network method or a winding method. In such case, a mandrel of any shape may be covered or wound with a meltable commercial film or sheet (including a thermoshrinkable film or tube) or, in some cases, a film or sheet-like coating may be formed by baking a meltable powder resin onto the mandrel or by painting the mandrel with a meltable resin solution.

Then, at a temperature at which the film or sheet with which the mandrel is coated can be melted or at a temperature at which both said film or sheet and the above mentioned fibers which are highly adhesive to said film or sheet and which have a softening point or melting point close to that of said film or sheet can be melted, said mandrel is heated or is heated and pressed so that both of said film or sheet and the fibers wound thereon and homogeneous with said film or sheet may be thermally fused together. Both said film or sheet and the fibers wound on the same mandrel, which is highly adhesive to said film or sheet and having a softening point or melting point close to that of said film or sheet, may be thermally fused together or the three components comprising said film or sheet, the fibers wound on the same mandrel and homogeneous with said film or sheet and the above mentioned heterogeneous fibers that is formed of a different substance from the film or sheet, also wound on the same mandrel may be thermally fused together and, after the molding, the mandrel is removed to obtain a cubic (or hollow cubic) air-tight fiber coated molding.

It is preferable that the above mentioned molding temperature be somewhat higher than the softening point or melting point of the film or sheet and the fibers to be melted. In case the film is to adhere to the mandrel, the material of the mandrel should be selected so that it will adhere to the film. This use is applied to joining pipes together for conveying a liquid or gas therethrough. Further, in separating the mandrel from the molded member after the molding, it is desirable to paint the mandrel with a mould releasing agent in advance.

For the meltable film or sheet and fibers to be used in the process of the present invention, there can be used such thermoplastic synthetic high molecular weight substances as polyethylene, polypropylene, polyamide, polyester, vinylon, polyvinyl chloride, polyvinylidene chloride, polycarbonate, trifluorethylene polymers, tetrafluoroethylene polymers and polyacetal and their copolymers and graft-polymers, acetate and nitrocellulose. The fibers which have a melting point higher than the above-mentioned substances and are to be used together with such thermoplastic synthetic high molecular weight substances are mostly natural fibers and metallic fibers.

The above mentioned fibers used in the process of the present invention may be in such fibrous forms as monofilaments, multifilaments, and staples as spun (or mixspun), tape-shaped fibers ,and fibers of different shapes can be all used.

In working the present invention, the softening point or melting point of the thermoplastic film or sheet and fibers is somewhat different depending on their composition, whether they have a crystallizability and cubic regularity, whether a plasticizer and stabilizer are added in molding and the amounts added. Therefore, by considering these points, the film or sheet and fibers should be selected and the heat-treating conditions should be determined. It is not difficult to use a combination of a thermoplastic film or sheet and fibers homogeneous to said film or sheet and having a softening point or melting point close to that of said film or sheet.

DETAILED DESCRIPTION OF THE INVENTION

Figure 1:
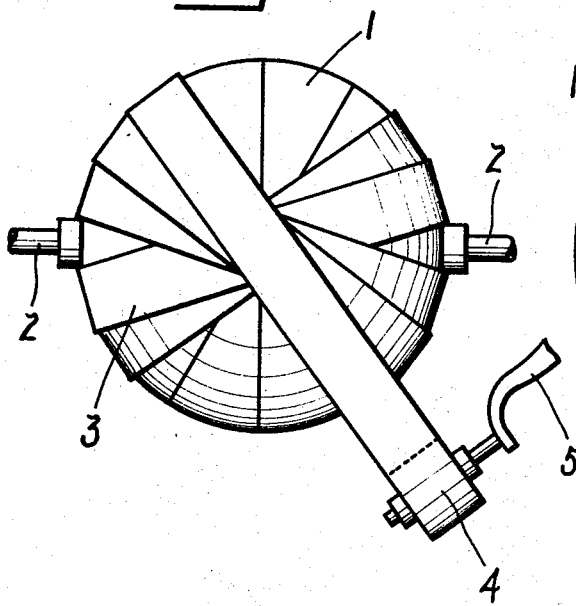
FIG. 1 is a plan view of a mandrel being covered with a film or sheet in accordance with the persent invention.

In the drawing a spherical mandrel 1 is mounted on a shaft 2. A film or sheet 3 is removed from a roll supported on an arm 5 and is wound, in a continuous manner, providing a complete covering on the exterior surface of the mandrel 1. As shown, the film or sheet is in a strip form conforming to the spherical surface of the mandrel and is wound in an over-lapping manner to cover the mandrel completely.

Figure 2:
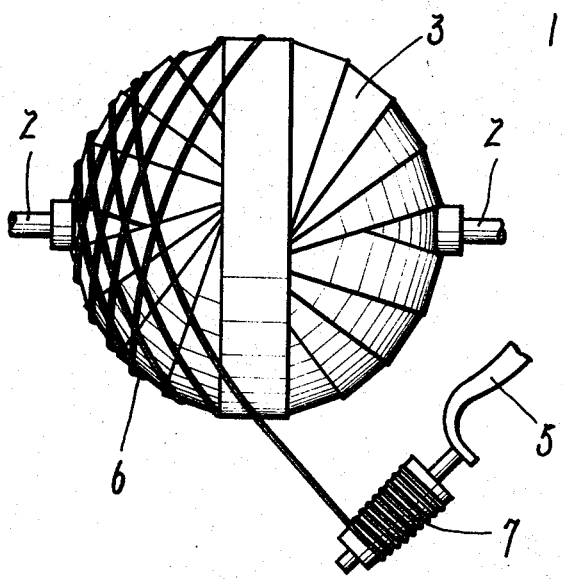
FIG. 2 is a plan view of a mandrel, similar to FIG. 1, with the mandrel covered with the film or sheet being wound with a fiber.

After the mandrel is covered with either a single or multi-layer covering of the film or sheet, a spool 7 of fibers 6 is mounted on the arm 5, see FIG. 2, and the fiber is wound, in a continuous fashion, about the outer surface of the film or sheet on the mandrel. A single type or several different types of fibers may be wound, as shown, to obtain the desired final molded product.

Figure 3:
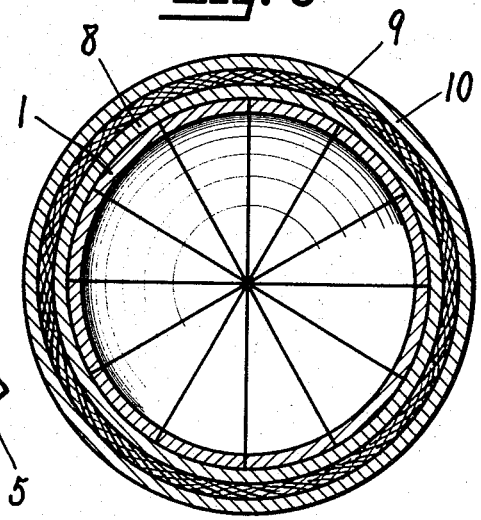
FIG. 3 is a cross-sectional view of the mandrel shown in FIG. 2 which illustrates the mandrel covered with a film or sheet and wound with fibers.
Figure 4:
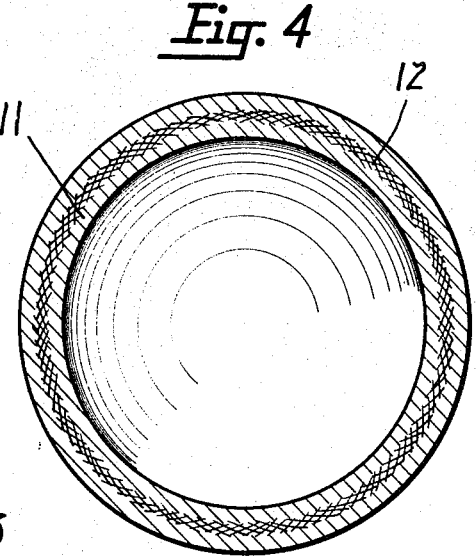
FIG. 4 is a cross-sectional view of the molded members shown in FIG. 3 after thermally fusing the film and fibers and removing the mandrel.

In FIG. 3 a cross-section of the assembly of the mandrel 1, the sheet or film 3 forming a layer 8 and fibers 6 forming a pair of layers of fibers 9 and 10 is shown. The layer of fibers 9 have a softening or melting point higher than that of the film or sheet while the layer of fibers 10 are formed of the same substance as the film or sheet. In FIG. 4 the assembly of the film or sheet and the fibers are shown in the thermally fused state and with the mandrel removed. When the temperature is raised to or above the melting point the film or sheet forming the layer 8 and the fibers formed of the same or similar substance and comprising the fiber layer 10 are fused while the layer of fibers 9 retains its original fiber form, not being fused, but is held on the molded member by the film or sheet and fibers which are fused together.

Examples of the process of the present invention are shown in the following.

EXAMPLE 1

A spherical mandrel, having a diameter of 25 cm., was coated or wrapped threefold on its entire surface with a commercial wrapping polypropylene film and then multifilaments of polypropylene fibers and multifilaments of nylon fibers dyed red in advance were wound on the film by means of a winding method. The amounts of the yarns required for winding were 275 m. of the multifilaments of propoylene fibers and 188 m. of the multifilaments of nylon fibers. The coated mandrel was then treated with hot wind at 185 to 195° C. for 20 minutes so that the polypropylene film and polypropylene fibers were partly melted and thermally fused together with the adjacent film or fibers, forming a molding or molded member. The molded member was then cooled and the mandrel removed.

This product was a strong air-tight hollow spherical molding having a pattern of two mixed colors of red and white and reinforced with nylon fibers.

EXAMPLE 2

A spherical mandrel having a diameter of 25 cm., was coated threefold on its entire surface with an elongated commercial polyethylene film and wound with multifilaments of Staflene (trade name) fibers which are polyethylene fibers and multifilaments of Tetoron (trade name) fibers which are polyester fibers in a ratio of 2:1 by means of a winding method. The coated and wound mandrel was heated at 150 to 155° C. for 20 minutes so that the polyethylene film and polyethylene fibers were partly melted and thermally fused together with the adjacent film or fibers and were cooled.

Then the molding or molded member formed by the thermally fused polyethylene film and fibers and the polyester fibers was painted by a spraying method on the surface with a resin solution prepared by dissolving 48 parts of Polon Coat (trade name) which is a silicone treating agent, 1 part of a catalyst for it and 20 parts of Teisan Resin SB 111 C (trade name) which is an acrylic resin solution in trichlorethylene so as to be 100 parts. After being painted the molding was cut into two equal parts with a knife and was taken off the mandrel. This product was reinforced with polyester fibers and was therefore adapted for use as a waterproof helmet highly resistant to impact.

EXAMPLE 3

A hexagonal pillar mandrel was coated threefold on its entire surface with Hishilex (trade name) which is an elongated film of polyvinyl chloride and then Caralyan (trade name) which is a flat polyethylene yarn and multifilaments of polypropylene fibers were wound on the coated mandrel by means of a winding method. The coated and wound mandrel was treated with hot wind at 125 to 135° C. for 20 minutes, cooled and then the mandrel was removed. This product was an air-tight hollow hexagonal pillar molding in which the polyvinyl chloride film and flat polyethylene yarn partly melted and were thermally fused together with the adjacent film or fibers.

EXAMPLE 4

A cylindrical mandrel, 20 cm. in diameter and 1 m. long, was coated with a thermoshrinkable Teflon tube film, that is a polytetrafluoroethylene film of a diameter larger than the mandrel. The film wash shrunk into close contact with the mandrel by applying hot wind at 320 to 330° C. Teflon fibers, that is polytetrafluoroethylene fibers, glass fibers and steel wires (piano wires) were wound on said film so as to cross one another by means of a winding method. Then the assembly was heat-treated in a furnace at about 330° C. for 20 minutes. After the assembly had cooled, the mandrel was removed and a cylindrical molding was obtained.

When the molding made in the same manner was cut with a knife in the direction of the length of the mandrel and was removed from the mandrel, a flat rectangular molding was obtained. This product was a tough heatproof, coldproof, oilproof and wearproof air-tight fiber coated molding in which the Teflon film and Teflon fibers were fused together and the Teflon fibers were partly fused to the steel wires, with the product being reniforced by the steel wires and glass fibers. The cylindrical molding was well adapted for use as a pipe for conveying chemicals in a chemical factory.

EXAMPLE 5

The joint part of two stainless steel pipes 25 cm. in diameter and 1.5 m. long was coated with a thermoshrinkable Teflon tube film having a diameter larger than the pipes. The film was shrunk into close contact with the stainless steel pipes by means of hot wind at 320° C. Teflon fibers, glass fibers and steel wires (piano wires) were wound on this film so as to cross one another by means of a winding method and the assembly was then heat-treated by feeding hot wind at about 330° C. for several minutes so that the two stainless steel pipes could be strongly jointed together. This product was specifically adapted for use as an acidproof conveying pipe.

In conventional welding of stainless steel pipes, pinholes are likely to be made and the jointing is difficult. But, in the process of the present invention, an excellent joint can be simply made.

EXAMPLE 6

A conical mandrel was first coated in close contact with a Teflon tube in the same manner as in Example 4. Then Teflon fibers and semiconductive acrylic fibers were wound about the tube. The combination was molded in a furnace at about 330° C. for 20 minutes. The molding was then taken out of the furnace, cooled and the mandrel removed. This product was a flexible fiber molding having a heatproofness and many other characteristics.

EXAMPLE 7

A square-section fine metallic bar mandrel was coated with a vinyl chloride film. Then Staflene (trade name) fibers which are polyethylene fibers, and Tetoron (trade name) cotton mix-spun yarns were wound on the film so as to cross one another by means of a winding method. The respective fibers had been dyed in different colors. These crossed fibers were heated and molded at 120° C. for 10 minutes with a press having a hot plate a little smaller than the mandrel. When the molding was cut and taken from the mandrel, a tough, beautiful, highly flexible air-tight square molding was obtained.

What is claimed is:

1. A process of producing cubic air-tight molded members comprising the steps of wrapping a meltable film material formed of a thermoplastic synthetic high molecular weight substance in sheet form about a mandrel, winding first fibers about the film material wound on the mandrel with the first fibers being formed of a thermoplastic synthetic high molecular weight substance having substantially the same melting temperature as the film material, winding second fibers about the film material and the first fibers on the mandrel with the second fibers being formed of a material having a higher melting temperature than that of the film material and the first fibers, heating the film material and the first and second fibers wound on the mandrel to a temperature sufficient for melting the film material and the first fibers and below the melting temperature of the second fibers for thermally fusing the film material and the first and second fibers together into a molded member, and removing the thermally fused molded member from the mandrel.

2. A process of producing cubic air-tight molded members comprising the steps of wrapping a meltable film material formed of a thermoplastic synthetic high molecular weight substance in sheet form about a mandrel, winding at least one type of first fibers about the film material on the mandrel with the first fibers being formed of a thermoplastic synthetic high molecular weight substance having substantially the same melting temperature as the film material and being highly adhesive to the film material, winding at least one type of second fibers on the film material and first fibers with the second fibers having a melting temperature higher than that of the first fibers, heating the film material and the first and second fibers wrapped and wound on the mandrel to temperature at least equal to the melting temperature of the film material and the first fibers and below the melting temperature of the second fibers for thermally fusing the film material and the first and second fibers together for forming a molded member, and removing the molded member from the mandrel.

References Cited

UNITED STATES PATENTS 2,988,240    6/1961    Hardesty _____ 220—3

PHILIP DIER, Primary Examiner

U.S. Cl. X.R.

156—173, 189; 220—3